United States Patent
Zhang

(10) Patent No.: US 12,238,778 B2
(45) Date of Patent: Feb. 25, 2025

(54) METHOD AND DEVICE FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 373 days.

(21) Appl. No.: 17/898,495

(22) Filed: Aug. 30, 2022

(65) Prior Publication Data

US 2023/0007696 A1 Jan. 5, 2023

Related U.S. Application Data

(63) Continuation of application No. PCT/CN2021/078452, filed on Mar. 1, 2021.

(30) Foreign Application Priority Data

Mar. 2, 2020 (CN) .......................... 202010135607.6

(51) Int. Cl.
*H04W 74/0833* (2024.01)
*H04W 74/00* (2009.01)

(52) U.S. Cl.
CPC ..... *H04W 74/0833* (2013.01); *H04W 74/002* (2013.01)

(58) Field of Classification Search
CPC ........... H04W 74/0833; H04W 74/002; H04W 76/27; H04W 76/11; H04W 48/19;
(Continued)

(56) References Cited

U.S. PATENT DOCUMENTS

| 2014/0156887 A1 | 6/2014 | Hartwich |
| 2014/0337549 A1 | 11/2014 | Hartwich |

(Continued)

FOREIGN PATENT DOCUMENTS

| CN | 110366191 A | 10/2019 |
| CN | 110831227 A | 2/2020 |

(Continued)

OTHER PUBLICATIONS

ISR received in application No. PCT/CN2021/078452 dated May 25, 2021.

(Continued)

*Primary Examiner* — Mohamed A Kamara

(57) ABSTRACT

The present application discloses a method and a device for wireless communications, comprising: receiving a first signaling; and transmitting a first signal; herein, the first signaling is used to indicate a first identifier and a second identifier; the first identifier and the second identifier are both used to determine the first node; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message. The present application determines the target identifier in a rational way to enhance the resource utilization ratio.

20 Claims, 4 Drawing Sheets

(58) Field of Classification Search
CPC .... H04W 24/02; H04L 5/0094; H04L 5/0053; Y02D 30/70
See application file for complete search history.

(56) References Cited

U.S. PATENT DOCUMENTS

| | | | |
|---|---|---|---|
| 2019/0387548 A1 | 12/2019 | Kim | |
| 2020/0314917 A1* | 10/2020 | Jeon | H04W 74/0833 |
| 2022/0225465 A1* | 7/2022 | Xu | H04W 76/34 |
| 2023/0309000 A1* | 9/2023 | Liu | H04W 68/00 |

FOREIGN PATENT DOCUMENTS

| | | |
|---|---|---|
| WO | 2019192896 A1 | 10/2019 |
| WO | 2019245335 A1 | 12/2019 |
| WO | 2020030124 A1 | 2/2020 |

OTHER PUBLICATIONS

First Search Report of Chinses patent application No. CN202010135607.6 dated Mar. 12, 2022.
Notification to Grant Patent Right for Invention of Chinses patent application No. CN202010135607.6 dated Apr. 8, 2022.
NEC (TP for NR BL CR for TS 38.423): further correction to I-Rnti 3GPP TSG-RAN WG3 #101 R3-184721 Aug. 9, 2018.
Intel Corporation, Ericsson Draft CR to 38.331 on CCCH msg 3 and 5G-S-TMSI partitioning 3GPP TSG-RAN WG2 Meeting #AH1807 R2-1810912 Jul. 6, 2018.
First Office Action of Chinese patent application No. CN202210650989.5 dated Mar. 1, 2024.
First Search Report of Chinese patent application No. CN202210650989.5 dated Feb. 29, 2024.
Nokia, Nokia Shanghai Bell "Discussion on 5G-S-TMSI code space" 3GPP TSG-RAN WG2 Meeting #101 R2-1804755 Apr. 20, 2018.

* cited by examiner

METHOD AND DEVICE FOR WIRELESS COMMUNICATION

CROSS REFERENCE TO RELATED APPLICATIONS

This application is a continuation of the International patent application PCT/CN2021/078452, filed on Mar. 1, 2021, claims the priority benefit of Chinese Patent Application No. 202010135607.6, filed on Mar. 2, 2020, the full disclosure of which is incorporated herein by reference.

BACKGROUND

Technical Field

The present application relates to transmission methods and devices in wireless communication systems, and in particular to a transmission method and device for reducing power consumption, increasing the system efficiency, reducing delay in the communication system and optimizing resource utilization in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum, and lower traffic interruption and call drop rate, higher security and privacy and support to lower consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IoT), Vehicular to X (V2X) and Device to Device (D2D), Unlicensed Spectrum communications, and monitoring on UE communication quality, network plan optimization, Non Terrestrial Network (NTN) and Terrestrial Network (TN), or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

SUMMARY

In various communication scenarios, a user may be allocated multiple identifiers, and the functions of these identifiers may or may not be the same. For each conversation a user often needs only one identifier to determine the node, but it can also use a combination of different identifiers to do so, thus the network can verify the user information upon reception of the identifiers, acquire relevant context, and create a corresponding processing entity on the network side to ensure user security and reserve resources, as well as establish the data channel of the core network; besides, there is an issue of what kind of and which identifier is to be used for a user, because the usage relates to the processing of the above procedures and whether a user can be accessed to a system, and different identifiers imply different ways of processing. The selection of identifiers not only involves the processing strategy of the network, the principle of system design but also relates to the delay of user access to the system and communications, the amount of power consumption, as well as the utilization efficiency of resources and security, hence is a significant issue particularly when it comes to network slicing. The issue is more apparent for a user in an idle state or an inactive state, since in such states the user cannot establish links with the system for performing data transmissions and configuration updates, and the system has not allocated dedicated transmission resources for the user, but communications in these states play an important role in many aspects, like reducing the delay of the user and power consumption, therefore, an extra mechanism design is required for guaranteeing the user's communications. Another important feature of inactive communications is that the method of transmitting user data and the method of transmitting signaling have to be efficient, and secure, and the security is generally implemented by integrity protection, encryption and authentication, none of which is easy to realize for a user in an inactive or idle state, for that the transmissions of identifiers themselves are an exposure which is potentially risky to the user. Therefore, how to enhance security and reduce possible risks are very important to ordinary users, especially to IoT users.

To address the above problem, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict. Besides, it should be noted that although the description above only takes IoT scenarios as an example of application scenario in the scheme proposed herein; the present application is also applicable to scenarios of non-terrestrial network scenarios, where similar technical effects can be achieved. Similarly, the present application also applies to scenarios where, for instance, Unmanned Aerial Vehicle (UAV) or Vehicle-mounted equipment is provided, to achieve similar technical effects. Additionally, the adoption of a unified solution for various scenarios, including but not limited to NTN and TN scenarios, contributes to the reduction of hardcore complexity and costs.

The present application provides a method in a first node for wireless communications, comprising:
receiving a first signaling; and
transmitting a first signal;
herein, the first signaling is used to indicate a first identifier and a second identifier, the first identifier and the second identifier both being used to determine the first node; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the first node is in a Radio Resource Control (RRC) Inactive state when transmitting the first signal.

In one embodiment, the issue to be solved in the present application includes: when the first node is transmitting Non-Access Stratum (NAS) data in a Radio Resource Control (RRC) inactive state, it needs to transmit an identifier of the node at the same time. The selection of identifiers will influence the efficiency and even security of system resources, which, if used improperly, may cause wastes of resources and electricity, and the user data may hardly be received correctly, other risks against security may also occur concurrently. So, an appropriate choice of the identifiers is crucial. By determining a transmission scenario of the user, choosing different identifiers and transmission methods according to methods and principles used in different cases, and associating these identifiers with the data block size or other conditions, the present application manages the address the above issue.

Specifically, according to one aspect of the present application, a first bit block is used for generating the first data block, and the first signal is a K-th retransmission for the first bit block, where K is a positive integer, a value of the K being used to determine the target identifier.

Specifically, according to one aspect of the present application, a third logical channel is used for bearing the first data block, the third logical channel being a logical channel other than the first logical channel and the second logical channel.

Specifically, according to one aspect of the present application, a length of the first identifier is a first length, while a length of the second identifier is a second length; the first length is unequal to the second length.

Specifically, according to one aspect of the present application, comprising:
the first receiver receiving a second signaling, the second signaling being used to determine N reference value(s), where N is a positive integer, the N said reference value(s) being used to determine the size of the first signal.

Specifically, according to one aspect of the present application, determination of the target identifier is used to minimize a number of padding bits carried by the first signal.

Specifically, according to one aspect of the present application, determination of the target identifier is related to a type of a random access procedure associated with the first signal.

Specifically, according to one aspect of the present application, the first node is a UE.

Specifically, according to one aspect of the present application, the first node is a terminal of Internet of Things (IoT).

Specifically, according to one aspect of the present application, the first node is a relay.

Specifically, according to one aspect of the present application, the first node is a vehicle-mounted terminal.

Specifically, according to one aspect of the present application, the first node is an aircraft.

The present application provides a method in a second node for wireless communications, comprising:
transmitting a first signaling; and
receiving a first signal;
herein, the first signaling is used to indicate a first identifier and a second identifier, the first identifier and the second identifier both being used to determine a transmitter for the first signal; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the transmitter for the first signal is in a Radio Resource Control (RRC) Inactive state when transmitting the first signal.

Specifically, according to one aspect of the present application, a first bit block is used for generating the first data block, and the first signal is a K-th retransmission for the first bit block, where K is a positive integer, a value of the K being used to determine the target identifier.

Specifically, according to one aspect of the present application, a third logical channel is used for bearing the first data block, the third logical channel being a logical channel other than the first logical channel and the second logical channel.

Specifically, according to one aspect of the present application, a length of the first identifier is a first length, while a length of the second identifier is a second length; the first length is unequal to the second length.

Specifically, according to one aspect of the present application, comprising:
the second transmitter transmitting a second signaling, the second signaling being used to determine N reference value(s), where N is a positive integer, the N said reference value(s) being used to determine the size of the first signal.

Specifically, according to one aspect of the present application, determination of the target identifier is used to minimize a number of padding bits carried by the first signal.

Specifically, according to one aspect of the present application, determination of the target identifier is related to a type of a random access procedure associated with the first signal.

Specifically, according to one aspect of the present application, the second node is a base station.

Specifically, according to one aspect of the present application, the second node is a relay.

Specifically, according to one aspect of the present application, the second node is a vehicle-mounted terminal.

Specifically, according to one aspect of the present application, the second node is an aircraft.

Specifically, according to one aspect of the present application, the second node is a group header.

Specifically, according to one aspect of the present application, the second node is a satellite.

The present application provides a first node for wireless communications, comprising:

a first receiver, receiving a first signaling; and
 a first transmitter, transmitting a first signal;
 herein, the first signaling is used to indicate a first identifier and a second identifier, the first identifier and the second identifier both being used to determine the first node; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the first node is in a Radio Resource Control (RRC) Inactive state when transmitting the first signal.

The present application provides a second node for wireless communications, comprising:

a second transmitter, transmitting a first signaling;
 a second receiver, receiving a first signal;
 herein, the first signaling is used to indicate a first identifier and a second identifier, the first identifier and the second identifier both being used to determine a transmitter for the first signal; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the transmitter for the first signal is in a Radio Resource Control (RRC) Inactive state when transmitting the first signal.

In one embodiment, compared with the prior art, the present application is advantageous in the following aspects:

When the first node needs to perform uplink data transmission in an RRC inactive state, it shall determine identifiers that need to be used; the identifiers are used to determine the first node, and more importantly, are required to ensure the utilization efficiency and even security of resources. For example, when a user is performing uplink transmissions, data of the user need to be encapsulate into a fixed data block to facilitate detection of the base station, the inadequacy of detecting capability of the base station or uncertainty of the detection itself will result in some trouble in the signal reception, once the reception is failed, more of the power of the first node will be consumed and the system resources will be reused more frequently. Therefore, the size of the fixed data block is restricted, i.e., a limited number of types of data blocks with a fixed size, which leads to a result that a larger number of padding bits will occur when the size of a first signal transmitted by the first node does not match with the size of the data block, thus causing unneeded wastes of resources. In addition, the above identifiers being transmitted in a transparent mode is insecure, so, when performing retransmissions, new identifiers shall be reconsidered to increase security; in the meantime, these aspects shall be taken into account comprehensively, under various requirements of security, different strategies of selecting identifiers are developed to ensure security and enhance the efficiency of resource utilization. The present application combines the selection of identifiers with the size of data carried by the first signal and the size of the first signal, along with consideration of the influence of retransmission, thus enhancing the resource utilization ratio while guaranteeing the security.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
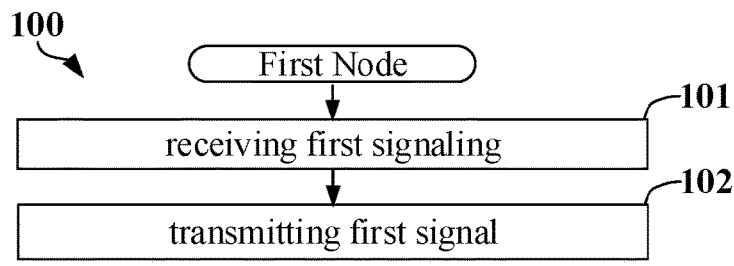
FIG. 1 illustrates a flowchart of receiving a first signaling and transmitting a first signal according to one embodiment of the present application.

Embodiment 1 illustrates a flowchart of receiving a first signaling and transmitting a first signal according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application receives a first signaling in step 101; and transmits a first signal in step 102;

herein, the first signaling is used to indicate a first identifier and a second identifier, the first identifier and the second identifier both being used to determine the first node; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the first node is in a Radio Resource Control (RRC) Inactive state when transmitting the first signal.

In one embodiment, the first node is a User Equipment (UE).

In one embodiment, the first signaling explicitly indicates the first identifier and the second identifier.

In one embodiment, the first signaling indicates a first identifier set, with the first identifier being one in the first identifier set.

In one embodiment, the first signaling indicates a first identifier set, with the first identifier being one in the first identifier set, and identifiers in the first identifier set are determined to be the first identifier in sequence.

In one embodiment, the first signaling indicates a first identifier set, with the first identifier being one in the first identifier set, and identifiers in the first identifier set are determined to be the first identifier in sequence, namely, when an identifier in the first identifier set is transmitted, a next identifier that follows the transmitted identifier in the first identifier set is determined to be the first identifier.

In one embodiment, the first signaling indicates a second identifier set, with the second identifier being one in the second identifier set.

In one embodiment, the first signaling indicates a second identifier set, with the second identifier being one in the second identifier set, and identifiers in the second identifier set are determined to be the second identifier in sequence.

In one embodiment, the first signaling indicates a second identifier set, with the second identifier being one in the second identifier set, and identifiers in the second identifier set are determined to be the second identifier in sequence, namely, when an identifier in the second identifier set is transmitted, a next identifier that follows the transmitted identifier in the second identifier set is determined to be the second identifier.

In one embodiment, the sequence includes a sequential order of identifiers being transmitted in the first identifier set.

In one embodiment, the sequence includes a sequential order of identifiers being transmitted in the second identifier set.

In one embodiment, the sequence includes a sequential order determined according to ASN.1.

In one embodiment, the sequence includes a sequential order indicated by the first signaling.

In one embodiment, the first identifier is used to determine the context of the first node.

In one embodiment, the second identifier is used to determine the context of the first node.

In one embodiment, the first message is an RRC message, and the second message is an RRC message.

In one embodiment, the first signal carries both an RRC message and data from a NAS.

In one embodiment, the first data block is embedded in a container within the first message carried by the first signal.

In one embodiment, the first data block is embedded in a container within the second message carried by the first signal.

In one embodiment, the first data block and the first message carried by the first signal are multiplexed as different MACs SDU within a same MAC PDU.

In one embodiment, the first data block and the second message carried by the first signal are multiplexed as different MACs SDU within a same MAC PDU.

In one embodiment, a length of the first identifier is 40 bits.

In one embodiment, a length of the first identifier is 24 bits.

In one embodiment, a length of the first identifier is 16 bits.

In one embodiment, a length of the second identifier is 40 bits.

In one embodiment, a length of the second identifier is 24 bits.

In one embodiment, a length of the second identifier is 16 bits.

In one embodiment, when the first data block is larger than D1, and a size of the first signal is smaller than S1, the first identifier is determined to be the target identifier; otherwise, the second identifier is determined to be the target identifier; where S1>D1, and S1 and D1 are both positive integers.

In one embodiment, when a ratio of a size of the first data block to a size of the first signal is smaller than B, the first identifier is determined to be the target identifier; otherwise, the second identifier is determined to be the target identifier; where B is a non-zero real number.

In one embodiment, when the first data block is larger than D2, and a size of the first signal is smaller than S2, a shorter one between the first identifier and the second identifier is determined to be the target identifier; otherwise, a longer one between the first identifier and the second identifier is determined to be the target identifier; where S2>D2, and S2 and D2 are both positive integers.

In one embodiment, when a ratio of a size of the first data block to a size of the first signal is smaller than B1, a shorter one between the first identifier and the second identifier is determined to be the target identifier; otherwise, a longer one between the first identifier and the second identifier is determined to be the target identifier; where B1 is a non-zero real number.

In one embodiment, the first signaling comprises a Master Information Block (MIB).

In one embodiment, the first signaling comprises a System Information Block (SIB).

In one embodiment, the first signaling comprises a System Information Block1 (SIB1).

In one embodiment, the first signaling comprises a Radio Resource Control (RRC) message.

In one embodiment, the first signaling comprises an RRCRelease message.

In one embodiment, the first signaling comprises an RRCReject message.

In one embodiment, the first signaling is transmitted on a Broadcast Control Channel (BCCH).

In one embodiment, the first signaling is transmitted on a Dedicated Traffic Channel (DTCH).

In one embodiment, the first signaling is transmitted in a Physical Downlink Shared Channel (PDSCH).

In one embodiment, the first signal comprises a Medium Access Control (MAC) signal.

In one embodiment, the first signal comprises a MAC Packet Data Unit (PDU).

In one embodiment, the first signal comprises a MAC Service Data Unit (SDU).

In one embodiment, the first signal comprises an RLC PDU

In one embodiment, the first signal comprises an RLC SDU

In one embodiment, the first signal is transmitted on a Physical Uplink Shared Channel (PUSCH).

In one embodiment, the first signal comprises an msg3.

In one embodiment, the first signal comprises an msgA.

In one embodiment, the first signal comprises a signal comprised in an msgA that is transmitted on a PUSCH.

In one embodiment, the first identifier comprises an Access Stratum (AS) identifier.

In one embodiment, the first identifier comprises a Non-Access-Stratum (NAS) identifier.

In one embodiment, the first identifier comprises a physical layer identifier.

In one embodiment, the first identifier comprises a Medium Access Control (MAC) layer identifier.

In one embodiment, the first identifier comprises a Radio Link Control (RLC) layer identifier.

In one embodiment, the first identifier comprises a Radio Resource Control (RRC) layer identifier.

In one embodiment, the first identifier comprises a Packet Data Convergence Protocol (PDCP) layer identifier.

In one embodiment, the first identifier comprises a Radio Network Temporary Identifier (RNTI).

In one embodiment, the first identifier comprises an I Radio Network Temporary Identifier (I-RNTI).

In one embodiment, the first identifier comprises a full I-RNTI (fullI-RNTI).

In one embodiment, the first identifier comprises a short I-RNTI (shortI-RNTI).

In one embodiment, the first identifier comprises a resumeIdentity.

In one embodiment, the second identifier comprises a resumeIdentity.

In one embodiment, the first identifier comprises a Message Authentication Code-Integrity (MAC-I).

In one embodiment, the first identifier comprises a short MAC-I (shortMAC-I).

In one embodiment, the first identifier comprises a resume MAC-I (resumeMAC-I).

In one embodiment, the second identifier comprises an AS identifier.

In one embodiment, the second identifier comprises a NAS identifier.

In one embodiment, the second identifier comprises a physical layer identifier.

In one embodiment, the second identifier comprises a Medium Access Control (MAC) layer identifier.

In one embodiment, the second identifier comprises a Radio Link Control (RLC) layer identifier.

In one embodiment, the second identifier comprises a Radio Resource Control (RRC) layer identifier.

In one embodiment, the second identifier comprises a Packet Data Convergence Protocol (PDCP) layer identifier.

In one embodiment, the second identifier comprises a Radio Network Temporary Identifier (RNTI).

In one embodiment, the second identifier comprises an I Radio Network Temporary Identifier (I-RNTI).

In one embodiment, the second identifier comprises a full I-RNTI (fullI-RNTI).

In one embodiment, the second identifier comprises a short I-RNTI (shortI-RNTI).

In one embodiment, the second identifier comprises a Message Authentication Code-Integrity (MAC-I).

In one embodiment, the second identifier comprises a short MAC-I (shortMAC-I).

In one embodiment, the second identifier comprises a resume MAC-I (resumeMAC-I).

In one embodiment, the target identifier is a field in the first signal.

In one embodiment, the first signal carries an index of the target identifier.

In one embodiment, the first signal indicates a type of the target identifier.

In one embodiment, the first signal implicitly carries the target identifier.

In one embodiment, the first message comprises an RRC message.

In one embodiment, the first message comprises an RRCResumeRequest message.

In one embodiment, the first message comprises an RRCResumeRequest1 message.

In one embodiment, the first message comprises an RRCSetupRequest message.

In one embodiment, the first message comprises an RRCDataTransmission message.

In one embodiment, the first message comprises an RRCReestablishmentRequest message.

In one embodiment, the second message comprises an RRC message.

In one embodiment, the second message comprises an RRCResumeRequest message.

In one embodiment, the second message comprises an RRCResumeRequest1 message.

In one embodiment, the second message comprises an RRCSetupRequest message.

In one embodiment, the second message comprises an RRCDataTransmission message.

In one embodiment, the second message comprises an RRCReestablishmentRequest message.

In one embodiment, the first logical channel includes a Common Control Channel (CCCH).

In one embodiment, the first logical channel includes a Dedicated Control Channel (DCCH).

In one embodiment, the first logical channel includes an uplink logical channel.

In one embodiment, the first logical channel includes a CCCH logical channel.

In one embodiment, the first logical channel includes a CCCH1 logical channel.

In one embodiment, the second logical channel includes a Common Control Channel (CCCH).

In one embodiment, the second logical channel includes a Dedicated Control Channel (DCCH).

In one embodiment, the second logical channel includes an uplink logical channel.

In one embodiment, the second logical channel includes a CCCH logical channel.

In one embodiment, the second logical channel includes a CCCH1 logical channel.

In one embodiment, the first logical channel and the second logical channel are different logical channels.

In one embodiment, the first logical channel and the second logical channel have different logical channel identifiers.

In one embodiment, the first logical channel and the second logical channel are different types of logical channels.

In one embodiment, the first data block comprises a PDCP SDU.

In one embodiment, the first data block comprises a PDCP PDU.

In one embodiment, the first data block comprises data from layers above a PDCP layer.

In one embodiment, the first data block comprises a control signaling from layers above a PDCP layer.

In one embodiment, the first data block is encapsulated in an RLC PDU.

In one embodiment, the first data block is embedded in an RRC message.

In one embodiment, when the first signal carries the first message, the first data block is embedded in the first message.

In one embodiment, when the first signal carries the second message, the first data block is embedded in the second message.

In one embodiment, the first node is in an RRC-INACTIVE state.

In one embodiment, an advantage of the above method includes: selecting a target identifier according to NAS data carried by the first signal and the size of the first signal is beneficial to increasing the resource utilization ratio.

In one embodiment, determination of the target identifier is related to a type of a random access procedure associated with the first signal.

In one embodiment, when the first node selects a 2 step Random Access Channel (2-step RACH), the first identifier is determined to be the target identifier.

In one embodiment, when the first node selects a 2 step Random Access Channel (2-step RACH), the second identifier is determined to be the target identifier.

In one embodiment, when the first node selects a 4 step Random Access Channel (4-step RACH), the first identifier is determined to be the target identifier.

In one embodiment, when the first node selects a 4 step Random Access Channel (4-step RACH), the second identifier is determined to be the target identifier.

In one embodiment, when the first node selects a fallback 2 step Random Access Channel (fallback 2-step RACH), the first identifier is determined to be the target identifier.

In one embodiment, when the first node selects a fallback 2 step Random Access Channel (fallback 2-step RACH), the second identifier is determined to be the target identifier.

In one embodiment, when the first node selects a 2-step RACH, a longer one between the first identifier and the second identifier is determined to be the target identifier.

In one embodiment, when the first node selects a 4-step RACH, a shorter one between the first identifier and the second identifier is determined to be the target identifier.

In one embodiment, when the first node selects a fallback 2-step RACH, a shorter one between the first identifier and the second identifier is determined to be the target identifier.

In one embodiment, a receiver for the first signal is a camping cell of the first node; a first quality is a signal quality of the receiver for the first signal, and the first quality is used to determine a type of a random access procedure associated with the first signal; when the first quality is smaller than a first quality threshold, the first node selects a 4-step RACH, and a shorter one between the first identifier and the second identifier is determined to be the target identifier.

In one embodiment, when the first quality is larger than a first quality threshold, determination of the target identifier is related to the size of the first data block and the size of the first signal.

In one embodiment, a signal quality of a receiver for the first signal includes a Reference Signal Receiving Power (RSRP) of a Synchronization Signal Block (SSB) transmitted by the receiver for the first signal.

In one embodiment, a signal quality of a receiver for the first signal includes a Reference Signal Receiving Quality (RSRQ) of an SSB transmitted by the receiver for the first signal.

In one embodiment, the first signal belongs to the random access procedure.

In one embodiment, before transmitting the first signal the first node needs to transmit a random access signal.

In one embodiment, while transmitting the first signal the first node needs to transmit a random access signal.

In one embodiment, the first signal initiates the random access procedure to transmit the first signal.

Embodiment 2

Figure 2:
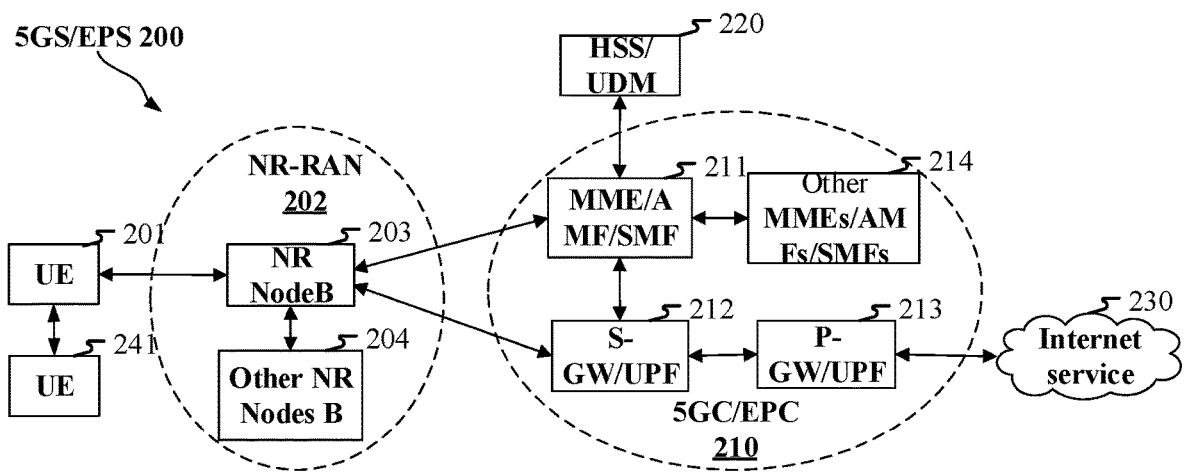
FIG. 2 illustrates a schematic diagram of a network architecture according to one embodiment of the present application.

Embodiment 2 illustrates a schematic diagram of a network architecture according to the present application, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/ interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present application.

In one embodiment, the UE 201 supports transmissions in NTN.

In one embodiment, the UE 201 supports transmissions in large-delay-difference networks.

In one embodiment, the UE 201 supports V2X transmission.

In one embodiment, the gNB203 corresponds to the second node in the present application.

In one embodiment, the gNB203 supports transmissions in NTN.

In one embodiment, the gNB203 supports transmissions in large-delay-difference networks.

In one embodiment, the gNB203 supports V2X transmission.

Embodiment 3

Figure 3:
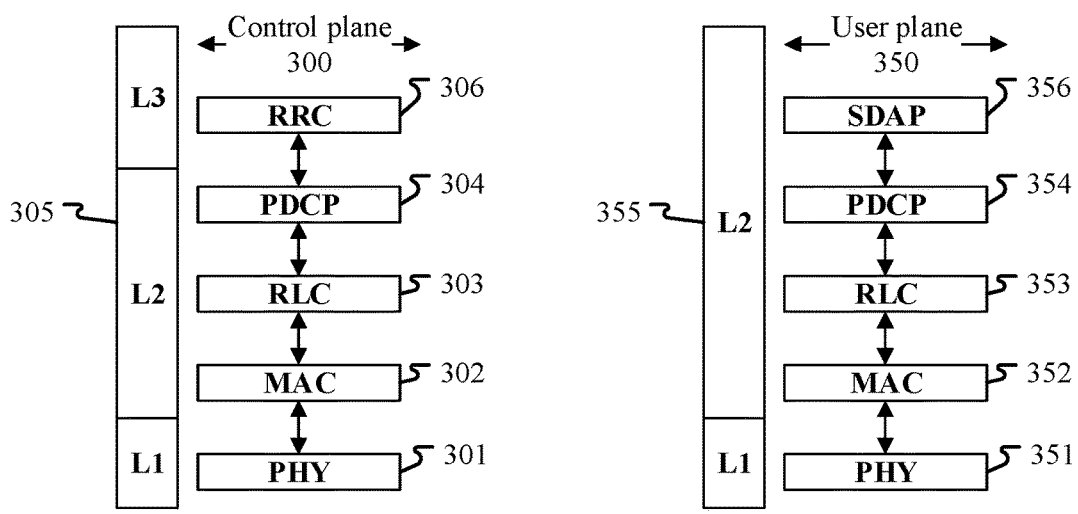
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, i.e., layer 1, layer 2 and layer 3. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several upper layers above the L2 355. Besides, it can also comprise a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling in the present application is generated by the PHY301, or the MAC302 or the RRC306.

In one embodiment, the first signal in the present application is generated by the MAC 302 or the RRC306.

In one embodiment, the second signaling in the present application is generated by the MAC 302 or the RRC306.

Embodiment 4

Figure 4:
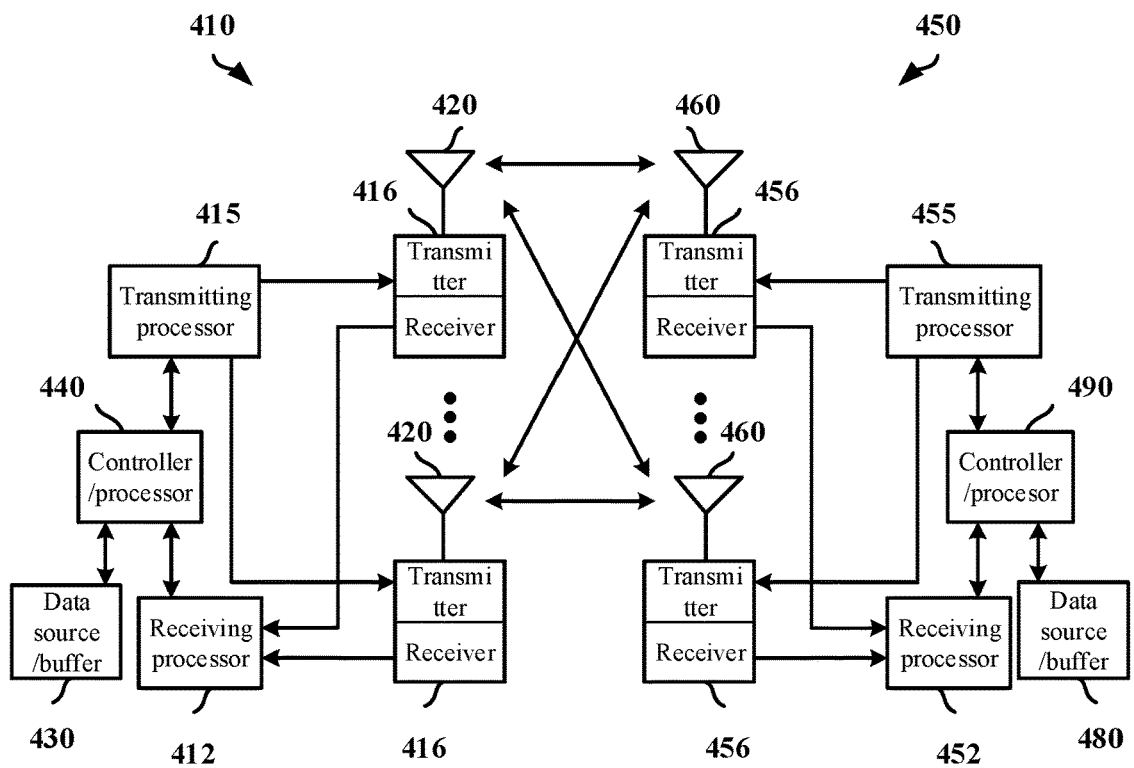
FIG. 4 illustrates a schematic diagram of a first node and a second node according to one embodiment of the present application.

Embodiment 4 illustrates a schematic diagram of a first communication device and a second communication device according to the present application, as shown in FIG. 4. FIG. 4 is a block diagram of a first communication device 450 and a second communication device 410 in communication with each other in an access network.

The first communication device 450 comprises a controller/processor 459, a memory 460, and a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also responsible for a retransmission of a lost packet, and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450—targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also in charge of a retransmission of a lost packet and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives a first signaling; and transmits a first signal; herein, the first signaling is used to indicate a first identifier and a second identifier, the first identifier and the second identifier both being used to determine the first node; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the first node is in a Radio Resource Control (RRC) Inactive state when transmitting the first signal.

In one embodiment, the first communication device 450 comprises a memory that stores computer readable instruction program, the computer readable instruction program generates an action when executed by at least one processor, which includes: receiving a first signaling; and transmitting a first signal; herein, the first signaling is used to indicate a first identifier and a second identifier, the first identifier and the second identifier both being used to determine the first node; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the first node is in a Radio Resource Control (RRC) Inactive state when transmitting the first signal.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits a first signaling; and receives a first signal; herein, the first signaling is used to indicate a first identifier and a second identifier, the first identifier and the second identifier both being used to determine a transmitter for the first signal; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the transmitter for the first signal is in a Radio Resource Control (RRC) Inactive state when transmitting the first signal.

In one embodiment, the second communication device 410 comprises a memory that stores computer readable instruction program, the computer readable instruction program generates an action when executed by at least one processor, which includes: transmitting a first signaling; and receiving a first signal; herein, the first signaling is used to indicate a first identifier and a second identifier, the first identifier and the second identifier both being used to determine a transmitter for the first signal; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the transmitter for the first signal is in a Radio Resource Control (RRC) Inactive state when transmitting the first signal.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a vehicle-mounted terminal.

In one embodiment, the second communication device 410 is a base station.

In one embodiment, the second communication device 410 is a UE.

In one embodiment, the first communication device 410 is a satellite.

In one embodiment, the receiver 456 (comprising the antenna 460), the receiving processor 452 and the controller/processor 490 are used for receiving the first signaling in the present application.

In one embodiment, the receiver 456 (comprising the antenna 460), the receiving processor 452 and the controller/processor 490 are used for receiving the second signaling in the present application.

In one embodiment, the transmitter 456 (comprising the antenna 460), the transmitting processor 455 and the controller/processor 490 are used for transmitting the first signal in the present application.

In one embodiment, the transmitter 416 (comprising the antenna 420), the transmitting processor 412 and the controller/processor 440 are used for transmitting the first signaling in the present application.

In one embodiment, the transmitter 416 (comprising the antenna 420), the transmitting processor 412 and the controller/processor 440 are used for transmitting the second signaling in the present application.

In one embodiment, the receiver 416 (comprising the antenna 420), the receiving processor 412 and the controller/processor 440 are used for receiving the first signal in the present application.

Embodiment 5

Figure 5:
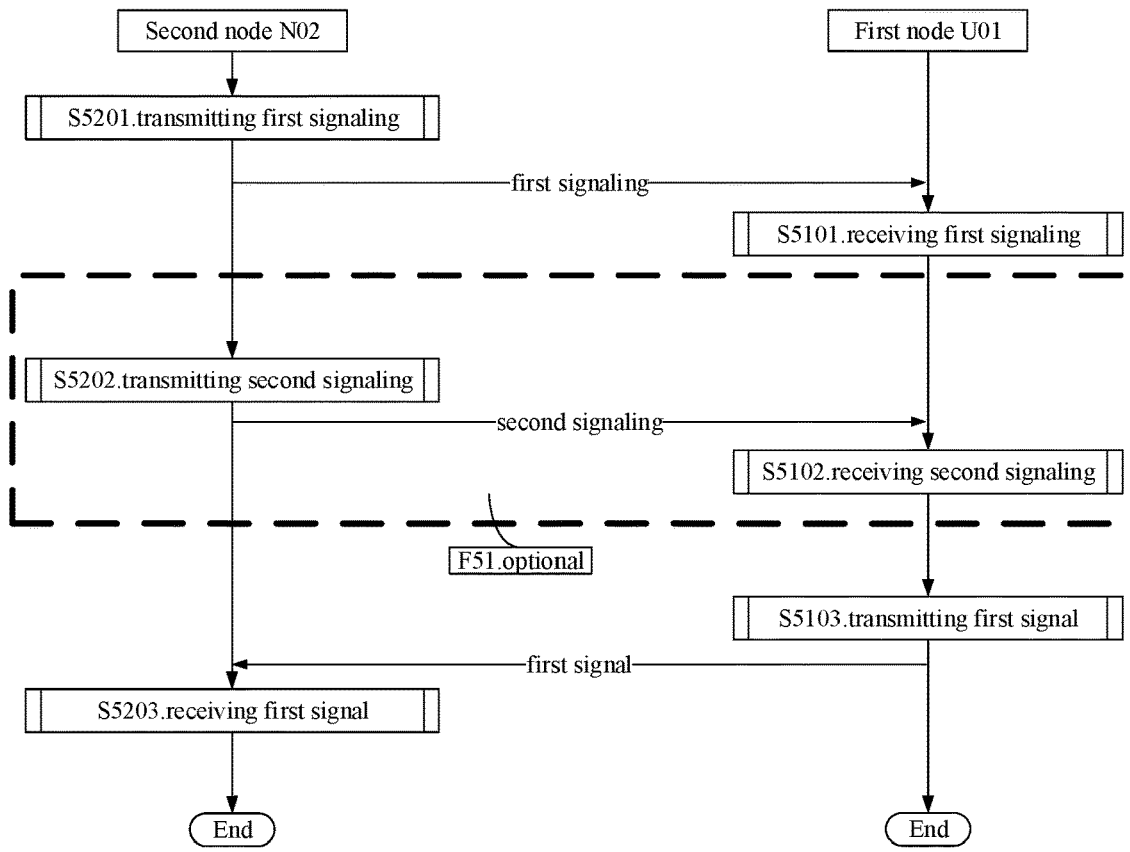
FIG. 5 illustrates a flowchart of transmission according to one embodiment of the present application.

Embodiment 5 illustrates a flowchart of radio signal transmission according to one embodiment of the present application, as shown in FIG. 5. In FIG. 5, the U01 corresponds to the first node in the present application, while the N02 corresponds to the second node in the present application. It should be particularly noted that the sequence illustrated herein does not set any limit to the signal transmission order or implementation order in the present application, the steps marked by the F51 herein are optional.

The second node N02 transmits a first signaling in step S5201.

The first node U01 receives the first signaling in step S5101; and transmits a first signal in step S5103.

In Embodiment 5, the first signaling is used to indicate a first identifier and a second identifier, the first identifier and the second identifier both being used to determine the first node; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the first node is in a Radio Resource Control (RRC) Inactive state when transmitting the first signal.

In one embodiment, the first signaling is transmitted by means of broadcast.

In one embodiment, the first signaling is transmitted by means of unicast.

In one embodiment, the first node is in an RRC connected state when receiving the first signaling in step S5101, the first signaling being transmitted by means of unicast.

In one embodiment, the first node is in an RRC connected state when receiving the first signaling in step S5101, the first signaling being transmitted through an RRCRelease signaling.

In one embodiment, the first node is in an RRC connected state when receiving the first signaling in step S5101, the first signaling being transmitted through an RRCRelease signaling, the first identifier comprises a fullI-RNTI in the RRCRelease signaling, while the second identifier comprises a shortI-RNTI in the RRCRelease signaling.

In one embodiment, the first node is in an RRC connected state when receiving the first signaling in step S5101, the first signaling being transmitted through an RRCRelease signaling, the second identifier comprises a fullI-RNTI in the RRCRelease signaling, while the first identifier comprises a shortI-RNTI in the RRCRelease signaling.

In one embodiment, a transmitter for the first signaling is the same as a receiver for the first signal.

In one embodiment, a transmitter for the first signaling is different from a receiver for the first signal.

In one embodiment, a transmitter for the first signaling and a receiver for the first signal belong to a same RAN Notification Area (RNA).

In one embodiment, the first signal either carries the first message or carries the second message; the first signal cannot carry the first message and the second message simultaneously.

In one embodiment, the first message is a message generated by a layer above an RLC layer.

In one embodiment, the second message is a message generated by a layer above an RLC layer.

In one embodiment, the first node is in an RRC Connected state when receiving the first signaling in step S5101; when transmitting the first signal, the first node is in an RRC Inactive state.

In one embodiment, the first node is in an RRC Inactive state when receiving the first signaling in step S5101; when transmitting the first signal, the first node is in an RRC Inactive state.

In one embodiment, the first node is in an RRC Idle state when receiving the first signaling in step S5101; when transmitting the first signal, the first node is in an RRC Inactive state.

In one embodiment, the first signaling comprises a nextHopChainingCount, the nextHopChainingCount being used to determine a KRRCint, the KRRCint being used to determine a MAC-I.

In one embodiment, the first signaling is used for indicating a source-c-RNTI, the source-c-RNTI being used to determine a MAC-I.

In one embodiment, the first signaling is used for indicating a sourcePhysCellId, the sourcePhysCellId being used to determine a MAC-I.

In one embodiment, the MAC-I is used to determine a resumeMAC-I.

In one embodiment, the first identifier comprises a MAC-I.

In one embodiment, the first identifier comprises a resumeMAC-I.

In one embodiment, the second identifier comprises a MAC-I.

In one embodiment, the second identifier comprises a resumeMAC-I.

In one embodiment, the second node N02 transmits a second signaling in step S5202.

In one embodiment, the first node U01 receives a second signaling in step S5102, the second signaling being used to determine N reference value(s), where N is a positive integer, the N said reference value(s) being used to determine the size of the first signal.

In one embodiment, the N said reference values include a TBS.

In one embodiment, the N said reference values include N possible values of the size of a first signal.

In one embodiment, the N said reference values, the size of the first data block and the size of the first signal, the length of the first identifier and the length of the second identifier are used to determine the target identifier, thus enabling a minimum number of padding bits comprised in the first signal.

In one embodiment, the first node U01 transmits a first signal in step S5103.

In one embodiment, the second node N02 receives a first signal in step S5203.

In one embodiment, the first signal is transmitted by a PUSCH.

In one embodiment, the first signal is transmitted by a Physical Sidelink Shared Channel (PSSCH).

In one embodiment, the first signal is transmitted by a Physical Sidelink Control Channel (PSCCH).

In one embodiment, an MCS of the first signal is determined by the N said reference values.

In one embodiment, a TBS of the first signal is determined by the N said reference values.

In one embodiment, the first bit block comprises X bit(s), where X is a positive integer.

In one embodiment, the first bit block comprises data of the NAS.

In one embodiment, the first bit block comprises a PDCP SDU.

In one embodiment, the first bit block comprises a PDCP PDU.

In one embodiment, the first bit block comprises data from layers above a PDCP layer.

In one embodiment, the first bit block comprises a control signaling from layers above a PDCP layer.

In one embodiment, the first bit block at least is required to be transmitted for K times before being correctly received.

In one embodiment, the first node does not receive a feedback signal for a (K-1)-th transmission of the first bit block.

In one embodiment, the first node receives a feedback signal for a (K-1)-th transmission of the first bit block, which is a reject signal.

In one embodiment, the first node receives a feedback signal for a (K-1)-th transmission of the first bit block, which is a wait signal.

In one embodiment, K=1.
In one embodiment, K=2.
In one embodiment, K=3.
In one embodiment, K=4.

In one embodiment, the first node transmits M signal(s) before transmitting the first signal, the M signal(s) being used for transmitting data from an NAS, identifiers that can be used by the first node to determine an identifier of the first node only include the first identifier and the second identifier, and the determination of the target signal is related to M, where M is a positive integer.

In one embodiment, M=1.
In one embodiment, M=2.

In one embodiment, the first identifier is a first I-RNTI, while the second identifier is a second I-RNTI; the first node transmits M1 signal(s) before transmitting the first signal, the M1 signal(s) being used for transmitting data from an NAS, before transmitting the first signal and the M1 signal(s) the first node only receives one signaling used for configuring the first identifier and the second identifier, and the determination of the target signal is related to M1.

In one embodiment, M1=1.
In one embodiment, M1=2.
In one embodiment, the first I-RNTI is a fullI-RNTI.
In one embodiment, the second I-RNTI is a fullI-RNTI.
In one embodiment, the first I-RNTI is a shortI-RNTI.
In one embodiment, the second I-RNTI is a shortI-RNTI.

In one embodiment, the first identifier is a first I-RNTI, while the second identifier is a second I-RNTI; the first node transmits M2 signal(s) before transmitting the first signal, the M2 signal(s) being used for transmitting data from an NAS, the first identifier and the second identifier are valid when transmitting the M2 signal(s) and when transmitting the first signal, and the determination of the target signal is related to M2.

In one embodiment, M2=1.
In one embodiment, M2=2.

In one embodiment, the K retransmissions comprise K random access procedures.

In one embodiment, the K retransmissions correspond to K random access procedures.

In one embodiment, the K retransmissions comprise K1 random access procedures, where K1 is a positive integer less than K.

In one embodiment, a third logical channel is used for bearing the first data block, the third logical channel being a logical channel other than the first logical channel and the second logical channel.

In one embodiment, the third logical channel has a different logical channel identifier from those of the first logical channel and the second logical channel.

In one embodiment, when the first signal carries the first message, the first data block and the first message are multiplexed in a same MAC PDU.

In one embodiment, when the first signal carries the second message, the first data block and the second message are multiplexed in a same MAC PDU.

In one embodiment, a length of the first identifier is a first length, while a length of the second identifier is a second length; the first length is unequal to the second length.

In one embodiment, the first length is greater than the second length.

In one embodiment, the first length is smaller than the second length.

Embodiment 6

Figure 6:
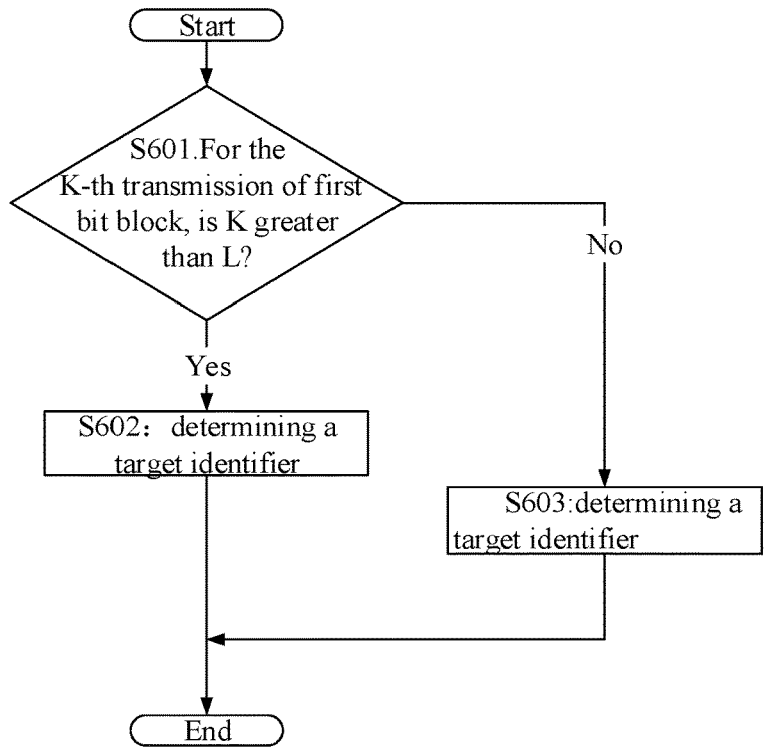
FIG. 6 illustrates a flowchart of transmission according to one embodiment of the present application.

Embodiment 6 illustrates a flowchart of radio signal transmission according to one embodiment of the present application, as shown in FIG. 6.

In one embodiment, a first bit block is used for generating the first data block, and the first signal is a K-th retransmission for the first bit block, where K is a positive integer, a value of the K being used to determine the target identifier.

In one embodiment, in step S601, for a K-th transmission of a first bit block, when K is greater than L, perform step S602 to determine a target identifier; in step S601, for a K-th transmission of a first bit block, when K is no greater than L, perform step S603 to determine a target identifier.

In one embodiment, L is a positive integer.

In one embodiment, L=1.

In one embodiment, L=2.

In one embodiment, L=3.

In one embodiment, L=4.

In one embodiment, L is indicated by a cell on which the first node is camped.

In one embodiment, L is indicated by a serving cell of the first node.

In one embodiment, in step S602, a number of times when an identifier carried by a signal carrying the first bit block is equal to the first identifier from a first transmission to a (K-1)-th transmission of the first bit block is f(K), when L=1, f(K)>1, the target identifier is the second identifier.

In one embodiment, in step S602, a number of times when an identifier carried by a signal carrying the first bit block is equal to the second identifier from a first transmission to a (K-1)-th transmission of the first bit block is f(K), when L=1, f(K)>1, the target identifier is the first identifier.

In one embodiment, in step S602, a number of times when an identifier carried by a signal carrying the first bit block includes the first identifier from a first transmission to a (K-1)-th transmission of the first bit block is f(K), which is larger than a number of times L when an identifier carried by the signal carrying the first bit block includes the second identifier, the target identifier is the second identifier.

In one embodiment, in step S602, a number of times when an identifier carried by a signal carrying the first bit block includes the first identifier from a first transmission to a (K-1)-th transmission of the first bit block is f(K), which is smaller than a number of times L when an identifier carried by the signal carrying the first bit block includes the second identifier, the target identifier is the first identifier.

In one embodiment, in step S602, a number of times when a signal carrying the first bit block simultaneously carries the first identifier from a first transmission to a (K-1)-th transmission of the first bit block is f(K), while a number of times when the signal carrying the first bit block simultaneously carries the second identifier is L; when f(K)>L, the second identifier is determined to be the target identifier; when F1<=F2, the first identifier is determined to be the target identifier.

In one embodiment, in step S602, when a first transmission of the first bit block through a K-th transmission of the first bit block belong to a same random access procedure, if a number of times f(K)>0 when the first bit block carries the first identifier in its (K-1)-th transmission, the first identifier is determined to be the target identifier; if a number of times f(K)>0 when the first bit block carries the second identifier in its (K-1)-th transmission, the second identifier is determined to be the target identifier.

In one embodiment, in step S602, when a (K-1)-th transmission of the first bit block and a K-th transmission of the first bit block belong to a same random access procedure, if the first bit block carries the first identifier in its (K-1)-th transmission, the first identifier is determined to be the target identifier; if the first bit block carries the second identifier in its (K-1)-th transmission, the second identifier is determined to be the target identifier.

In one embodiment, in step S602, when a (K-1)-th transmission of the first bit block and a K-th transmission of the first bit block belong to different random access procedures, if the first bit block carries the first identifier in its (K-1)-th transmission, the second identifier is determined to be the target identifier; if the first bit block carries the second identifier in its (K-1)-th transmission, the first identifier is determined to be the target identifier.

In one embodiment, in step S602, when a (K-1)-th transmission of the first bit block and a K-th transmission of the first bit block belong to different random access procedures, if the first bit block carries the first identifier in its (K-1)-th transmission, the second identifier is determined to be the target identifier, unless carrying the second identifier results in that the size of the first signal exceeds an allowable maximum value of the size of the first signal so that the first identifier is determined to be the target identifier; if the first bit block carries the second identifier in its (K-1)-th transmission, the first identifier is determined to be the target identifier, unless carrying the first identifier results in that the size of the first signal exceeds an allowable maximum value of the size of the first signal so that the second identifier is determined to be the target identifier.

In one embodiment, in step S602, determination of the target identifier is related to identifiers used before a K-th transmission of the first bit block.

In one embodiment, in step S602, determination of the target identifier is related to identifiers used in a (K-1)-th transmission of the first bit block.

In one embodiment, in step S602, determination of the target identifier is related to whether a first transmission of the first bit block through the K-th transmission of the first bit block belong to a same random access procedure.

In one embodiment, in step S602, an identifier between the first identifier and the second identifier which is less frequently used before a K-th transmission of the first bit block is determined to be the target identifier.

In one embodiment, in step S602, the first identifier is a resumeMAC-I, and the first identifier is generated by a least significant bit in a MAC-I of the first node, while the second identifier is generated by the MAC-I, and the second identifier is unequal to the first identifier, a number of times when the resumeMAC-I is used in the (K-1)-th transmission of the first bit block is f(K), when f(K)>L=0, the second identifier is determined to be a target identifier.

In one embodiment, in step S603, when the first data block is larger than D1, and a size of the first signal is smaller than S1, the first identifier is determined to be the target identifier; otherwise, the second identifier is determined to be the target identifier; where S1>D1, and S1 and D1 are both positive integers.

In one embodiment, in step S603, when a ratio of a size of the first data block to a size of the first signal is smaller than B, the first identifier is determined to be the target identifier; otherwise, the second identifier is determined to be the target identifier; where B is a non-zero real number.

In one embodiment, in step S603, when the first data block is larger than D2, and a size of the first signal is smaller than S2, a shorter one between the first identifier and the second identifier is determined to be the target identifier; otherwise, a longer one between the first identifier and the second identifier is determined to be the target identifier; where S2>D2, and S2 and D2 are both positive integers.

In one embodiment, in step S603, when a ratio of a size of the first data block to a size of the first signal is smaller than B1, a shorter one between the first identifier and the second identifier is determined to be the target identifier; otherwise, a longer one between the first identifier and the second identifier is determined to be the target identifier; where B1 is a non-zero real number.

In one embodiment, in step S603, a first data size refers to a size of data comprised in the first signal other than the first data block, where a size of the first signal and a size of the first data block are used to determine the first data size; when the first data size is larger than a longer one between the first identifier and the second identifier, the longer one identifier is determined to be the target identifier; when the first data size is smaller than a longer one between the first identifier and the second identifier and larger than a shorter one between the first identifier and the second identifier, the shorter one identifier is determined to be the target identifier.

In one embodiment, in step S603, a first data size refers to a size of data comprised in the first signal other than the first data block and a first offset, where a size of the first signal and a size of the first data block are used to determine the first data size; when the first data size is larger than a longer one between the first identifier and the second identifier, the longer one identifier is determined to be the target identifier; when the first data size is smaller than a longer one between the first identifier and the second identifier and larger than a shorter one between the first identifier and the second identifier, the shorter one identifier is determined to be the target identifier.

In one embodiment, a packet header of the first signal is used to determine the first offset.

In one embodiment, the first offset is a size of a packet header of the first signal.

In one embodiment, the first offset is a number of bits of a packet header of the first signal.

In one embodiment, the first offset comprises a number of remaining bits in the first message excluding the first identifier.

In one embodiment, the first offset comprises a number of remaining bits in the second message excluding the second identifier.

In one embodiment, the first offset comprises a size of a packet header of the first signal.

In one embodiment, in step S603, the target identifier is related to a size of the first data block, a size of the first signal, the first length and the second length.

In one embodiment, in step S603, the target identifier is related to a difference between a size of the first signal and a size of the first data block, and to a difference between the first length and the second length.

Embodiment 7

Figure 7:
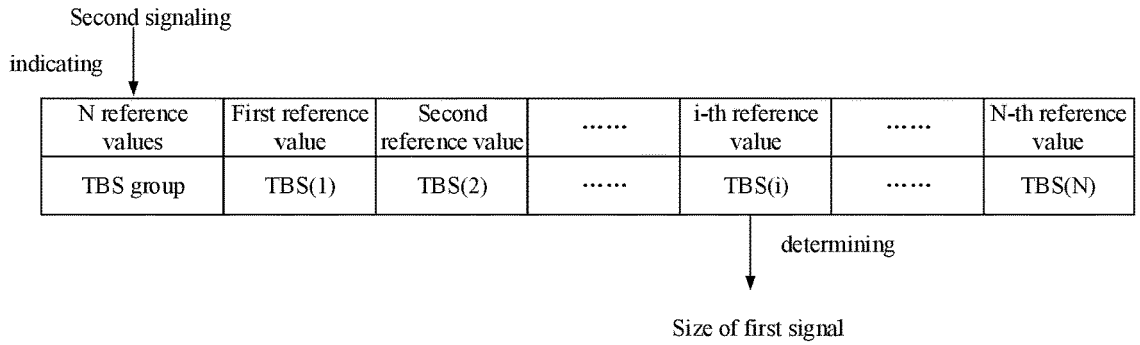
FIG. 7 illustrates a schematic diagram of determining a size of a first signal according to one embodiment of the present application.

Embodiment 7 illustrates a schematic diagram of determining a size of a first signal according to one embodiment of the present application, as shown in FIG. 7.

In one embodiment, the second signaling explicitly indicates the N said reference values.

In one embodiment, the second signaling explicitly indicates a maximum one of the N said reference values, where the remaining N−1 said reference value(s) is(are) associated with the maximum one of the N said reference values.

In one embodiment, the second signaling indicates a first reference value, which is a maximum one of the N said reference values, where between the remaining N−1 said reference value(s) and the first reference value there is a fixed corresponding relationship.

In one embodiment, the second signaling indicates a second reference value, which is one of the N said reference values, where between the remaining N−1 said reference value(s) and the second reference value there is a fixed corresponding relationship.

In one embodiment, the second signaling indicates a first index, the first index being associated with the N said reference values.

In one embodiment, the second signaling indicates the value of N.

In one embodiment, the value of N is related to the value of K.

In one embodiment, the value of N is related to a type of a random access procedure associated with the first signal.

In one embodiment, the N said reference values include N Transport Block Size (TBS) values.

In one embodiment, the N said reference values correspond to a TBS group, the TBS group comprising N Transport Block Size (TBS) values.

In one embodiment, the N said reference values include size values of N reference MAC PDUs.

In one embodiment, the N said reference values include N Modulation and Coding Scheme (MCS) values.

In one embodiment, a size of the first signal is one among the N said reference values.

In one embodiment, a size of the first signal belongs to a TBS determined by one reference value among the N said reference values.

In one embodiment, the N said reference values are used to determine N TBS values.

In one embodiment, the N said reference values are size values of the N MAC SDUs, and the N said MAC SDU size values are used to determine the N TBS values.

In one embodiment, the N said reference values are the N TBS values.

In one embodiment, the N said reference values are N said MCS values, and the N said MCS values are used to determine the N TBS values.

In one embodiment, when the first signal carries the first message, W1 is a sum of a size of the first data block, a size of the first message and sizes of a header and subheaders required for encapsulating the first data block and the first message in a MAC PDU; TBS(i) is a smallest one of TBSs larger than the W1 among the N said TBS values; the size of the first signal is the TBS(i).

In one embodiment, when the first signal carries the second message, W2 is a sum of a size of the first data block, a size of the second message and sizes of a header and subheaders required for encapsulating the first data block and the second message in a MAC PDU; TBS(i) is a smallest one of TBSs larger than the W2 among the N said TBS values; the size of the first signal is the TBS(i).

In one embodiment, when the first signal carries the first message, W3 is a size of a MAC PDU in which the first data block and the first message can be encapsulated and where the first data block and the first message are multiplexed; TBS(i) is a smallest one of TBSs larger than the W3 among the N said TBS values; the size of the first signal is the TBS(i).

In one embodiment, when the first signal carries the second message, W4 is a size of a MAC PDU in which the first data block and the second message can be encapsulated and where the first data block and the second message are multiplexed; TBS(i) is a smallest one of TBSs larger than the W4 among the N said TBS values; the size of the first signal is the TBS(i).

In one embodiment, a sum of a size of the first data block, a size of a message bearing the target identifier and a total number of bits of a header and subheaders required for encapsulating the first data block and the message bearing the target identifier in a MAC PDU; TBS(i) is a smallest one of TBSs larger than the W5 among the N said TBS values; the size of the first signal is the TBS(i).

In one embodiment, a size of a smallest possible MAC PDU generated by multiplexing the first data block and the message bearing the target identifier in a same MAC PDU is W6; TBS(i) is a smallest one of TBSs larger than the W6 among the N said TBS values; the size of the first signal is the TBS(i).

In one embodiment, TBS(i) is a smallest one of TBSs larger than a message capable of bearing the first data block and used for carrying the target identifier among the N said TBS values; the size of the first signal is the TBS(i).

In one embodiment, the first data block, together with a size of a message carrying the target identifier and a W8-th offset, is used to determine i; the size of the first signal is the TBS(i).

In one embodiment, the W8 offsets are related to a header of a MAC PDU.

In one embodiment, the W8 offsets are related to an overhead of a MAC PDU.

In one embodiment, the W8 offsets are related to a number of bits other than a MAC SDU required for packaging a MAC PDU.

In one embodiment, the W8 offsets are related to a number of bits other than a MAC SDU required for encapsulating the first data block and a message carrying the target identifier in a same MAC PDU.

In one embodiment, the message carrying the target identifier is an RRC message.

In one embodiment, the message carrying the target identifier is a first message.

In one embodiment, the message carrying the target identifier is a second message.

In one embodiment, the second signaling comprises a System Information Block (SIB).

In one embodiment, the second signaling comprises a System Information Block1 (SIB1).

In one embodiment, the second signaling comprises a Radio Resource Control (RRC) message.

In one embodiment, the second signaling comprises an RRCRelease message.

In one embodiment, the second signaling comprises an RRCReject message.

In one embodiment, the second signaling is transmitted on a Broadcast Control Channel (BCCH).

In one embodiment, the second signaling is transmitted on a Dedicated Traffic Channel (DTCH).

In one embodiment, the second signaling is transmitted in a Physical Downlink Shared Channel (PDSCH).

In one embodiment, the second signaling explicitly indicates the N said reference values.

In one embodiment, the second signaling explicitly indicates a maximum one of the N said reference values, where the remaining N−1 said reference value(s) is(are) determined in a pre-defined manner.

In one embodiment, the second signaling explicitly indicates a first reference value, which is a maximum one of the N said reference values, where between the remaining N−1 said reference value(s) and the first reference value there is a fixed corresponding relationship.

In one embodiment, the second signaling explicitly indicates a second reference value, which is one of the N said reference values, where between the remaining N−1 said reference value(s) and the second reference value there is a fixed corresponding relationship.

In one embodiment, the second signaling indicates a first index, and between the first index and the N said reference values there is a one-to-one mapping relationship.

In one embodiment, the N said reference values are positive integers.

In one embodiment, the N said reference values are mutually different.

In one embodiment, the N said reference values have uniqueness.

In one embodiment, N=1.

In one embodiment, N=2.

In one embodiment, N=4.

In one embodiment, the second signaling indicates the value of N.

In one embodiment, the N said reference values include N Transport Block Size (TBS) values.

In one embodiment, the N said reference values include size values of N MAC PDUs.

In one embodiment, the N said reference values include N Modulation and Coding Scheme (MCS) values.

In one embodiment, a size of the first signal is one among the N said reference values.

In one embodiment, a size of the first signal belongs to a TBS determined by one reference value among the N said reference values.

Embodiment 8

Figure 8:
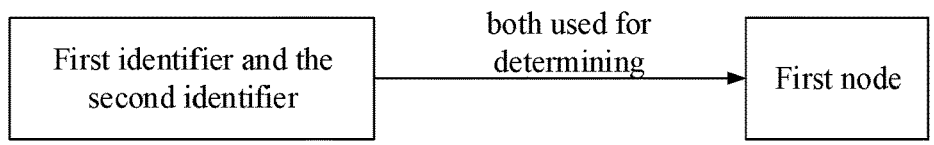
FIG. 8 illustrates a schematic diagram of a first identifier and a second identifier being used to determine a first node according to one embodiment of the present application.

Embodiment 8 illustrates a schematic diagram of a first identifier and a second identifier being used to determine a first node according to one embodiment of the present application, as shown in FIG. 8.

In one embodiment, the first identifier can be used to determine the context of the first node.

In one embodiment, the second identifier can be used to determine the context of the first node.

In one embodiment, the first identifier is used to determine the context of the first node.

In one embodiment, the second identifier is used to determine the context of the first node.

In one embodiment, the first identifier is unique within a cell on which the first node is camped.

In one embodiment, the second identifier is unique within a cell on which the first node is camped.

In one embodiment, the first identifier is unique within an associated RNA.

In one embodiment, the second identifier is unique within an associated RNA.

In one embodiment, the first identifier comprises a shortI-RNTI, the first identifier and a resumeMAC-I associated with the first identifier can uniquely determine the first node.

In one embodiment, the second identifier comprises a shortI-RNTI, the second identifier and a resumeMAC-I associated with the second identifier can uniquely determine the first node.

In one embodiment, the first identifier comprises a resumeMAC-J, the first identifier and a shortI-RNTI associated with the first identifier can uniquely determine the first node.

In one embodiment, the second identifier comprises a resumeMAC-J, the second identifier and a shortI-RNTI associated with the second identifier can uniquely determine the first node.

In one embodiment, the first node can be determined by either of the first identifier and the second identifier.

In one embodiment, the target identifier is a resumeIdentity, and the first signal carries a resumeIdentity and a resumeMAC-I, the resumeIdentity and the resumeMAC-I being associated.

In one embodiment, the target identifier is a resumeIdentity, the resumeIdentity being associated with a resumeMAC-J; a first bit block is used for generating the first data block, and the first signal is a K-th retransmission for the first bit block, K being a positive integer; when the target identifier is different from a resumeIdentity used by the first bit block in its (K-1)-th transmission, the content of a resumeMAC-I carried by the first signal is different from the content of a resumeMAC-J used by the first bit block in its (K-1)-th transmission.

In one embodiment, the target identifier is a resumeIdentity, the resumeIdentity being associated with a resumeMAC-J; a first bit block is used for generating the first data block, and the first signal is a K-th retransmission for the first bit block, K being a positive integer; when the target identifier is different from a resumeIdentity used by the first bit block in its (K-1)-th transmission, the first signal carries a resumeMAC-J associated with a resumeIdentity carried by the first signal.

Embodiment 9

Figure 9:
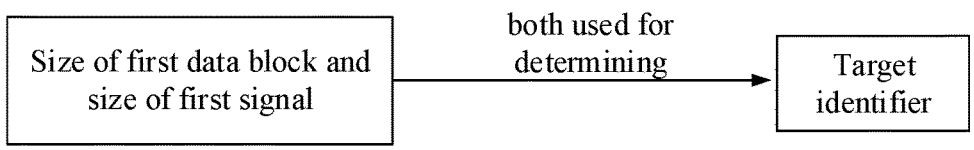
FIG. 9 illustrates a schematic diagram of a size of a first data block and a size of a first signal both being used to determine a target identifier according to one embodiment of the present application.

Embodiment 9 illustrates a schematic diagram of a size of a first data block and a size of a first signal both being used to determine a target identifier according to one embodiment of the present application; as shown in FIG. 9.

In one embodiment, a size of the first data block is used to determine the target identifier.

In one embodiment, a size of the first signal is used to determine the target identifier.

In one embodiment, when a size of the first data block being larger than R1 leads to a result that selecting a longer one between the first identifier and the second identifier as the target identifier will makes a size of the first signal exceed a maximum value that is allowable, a shorter one between the first identifier and the second identifier is determined to be the target identifier, R1 being related to the maximum value that is allowable.

In one embodiment, the first signal carries the first data block, and a size of the first data block is used to determine a size of the first signal, between the first identifier and the second identifier the identifier that enables a minimum number of padding bits comprised in the first signal is determined to be the target identifier.

In one embodiment, a size of the first signal is determined by a size of the first data block and N allowable candidate values, between the first identifier and the second identifier the identifier that enables a minimum number of padding bits comprised in the first signal is determined to be the target identifier.

In one embodiment, the N allowable candidate values are the N said reference values.

In one embodiment, when an allowable size of the first signal is E2, and a size of the first data block is larger than E2−U2 and smaller than E2−U2+H2, a shorter one between the first identifier and the second identifier is determined to be the target identifier; otherwise, a longer one between the first identifier and the second identifier is determined to be the target identifier.

In one embodiment, E2 is indicated by the first signaling.

In one embodiment, E2 is indicated by the system message.

In one embodiment, E2 is indicated by a cell on which the first node is camped.

In one embodiment, the first message is of a size smaller than the second message, the U2 comprising a number of all bits other than the first identifier in the first message.

In one embodiment, the second message is of a size smaller than the first message, the U2 comprising a number of all bits other than the second identifier in the second message.

In one embodiment, the U2 comprises a number of bits of a MAC SDU bearing a message that carries the target identifier being subtracted by a length of the target identifier.

In one embodiment, the U2 comprises a number of bits other than a MAC SDU in the first signal.

In one embodiment, the U2 comprises a number of bits in a MAC Control Element (CE) and its subheader.

In one embodiment, the first signal is a MAC PDU, the U2 comprising a number of bits comprised in the first signal being subtracted firstly by a length of the target identifier, then by a number of padding bits in a MAC subPDU carried by the first signal and finally by a number of bits in the first data block.

In one embodiment, the first signal is a MAC PDU, the U2 comprising a number of bits other than a length of the target identifier and padding bits in a MAC subPDU as well as the first data block comprised in the first signal.

In one embodiment, the first signal is a MAC PDU, the U2 comprising a number of bits comprised in the first signal being subtracted firstly by a length of the target identifier, then by a number of padding bits of a MAC layer in a MAC subPDU carried by the first signal and finally by a size of the first data block.

In one embodiment, the first signal is a MAC PDU, the U2 comprising a number of bits other than a length of the target identifier and padding bits of a MAC layer in a MAC subPDU as well as the first data block comprised in the first signal.

In one embodiment, the U2 comprises a number of bits of a header and subheaders required for encapsulating the first data block and a message carrying the target identifier in a MAC PDU.

In one embodiment, the U2 comprises a number of bits in a MAC header and subheaders.

In one embodiment, the U2 comprises an overhead introduced in a MAC layer.

In one embodiment, H2 is related to a difference between a length of the first identifier and a length of the second identifier.

In one embodiment, H2 is related to a difference between the first length and the second length.

In one embodiment, H2 is equal to an absolute value of a difference between the first length and the second length.

In one embodiment, H2 is related to an absolute value of a difference between the first length and the second length.

In one embodiment, E2 is one among the N said reference values.

In one embodiment, E2 is one among TBSs determined by the N said reference values.

In one embodiment, when a shorter one between the first identifier and the second identifier is larger than the E2−U2+

H2, a smallest one of TBSs larger than E2 among all TBSs determined by the N said reference values is replaced by E2.

In one embodiment, when a shorter one between the first identifier and the second identifier is larger than the E2−U2+H2, E3 is a smallest one of TBSs larger than E2 among all TBSs determined by the N said reference values; a size of the first signal is E3, and when a size of the first data block is larger than E3−U2 and smaller than E2−U2+H2, a shorter one between the first identifier and the second identifier is determined to be the target identifier; otherwise, a longer one between the first identifier and the second identifier is determined to be the target identifier.

In one embodiment, the first signaling indicates a first identifier set; a first bit block is used for generating the first data block, and the first signal is a K-th retransmission for the first bit block, K being a positive integer; an identifier in the first identifier set different from an I-RNTI used in a (K-1)-th transmission of the first bit block is determined to be the first identifier; a size of the first data block and a size of the first signal are used to determine the target identifier.

Embodiment 10

Figure 10:
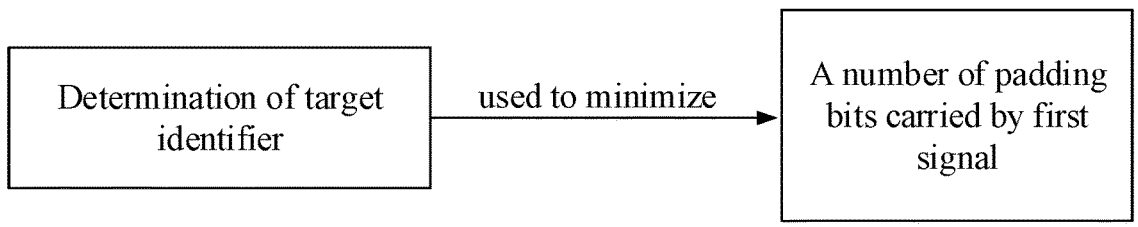
FIG. 10 illustrates a schematic diagram of a target identifier being used to minimize a number of padding bits carried by a first signal according to one embodiment of the present application.

Embodiment 10 illustrates a schematic diagram of a target identifier being used to minimize a number of padding bits carried by a first signal according to one embodiment of the present application; as shown in FIG. 10.

In one embodiment, with a given size of the first signal that is allowable, the selection of the target identifier is used to decrease the number of padding bits in the first signal as many as possible.

In one embodiment, the number of padding bits includes padding.

In one embodiment, the number of padding bits includes padding introduced from a MAC layer.

In one embodiment, the number of padding bits includes padding indicated by a logical channel identified by 63.

In one embodiment, the number of padding bits includes padding with a logical channel being 63 indicated by an associated subheader.

In one embodiment, the number of padding bits includes padding in an end of a MAC PDU.

In one embodiment, a length of the first identifier is different from a length of the second identifier, and the padding included by the first signal is determined by a length of the target identifier.

In one embodiment, an allowable size of the first signal is a finite number, and the size of the first signal is related to the selection of the target identifier.

In one embodiment, the N said reference values determine N TBSs, and the length of the target identifier is related to a TBS used by the first signal.

In one embodiment, the N said reference values determine N TBSs, and the length of the target identifier is related to whether a TBS used by the first signal when carrying the first identifier is the same as a TBS used by the first signal when carrying the second identifier.

In one embodiment, the N said reference values determine N TBSs, and the length of the target identifier is used to determine a TBS used by the first signal; in the case where the TBS used by the first signal when the first identifier is determined as a target identifier is greater than the TBS used by the first signal when the second identifier is determined as a target identifier, the second identifier is determined as the target identifier.

In one embodiment, the N said reference values determine N TBSs, and the length of the target identifier is used to determine a TBS used by the first signal; in the case where the TBS used by the first signal when the first identifier is determined as a target identifier is the same as the TBS used by the first signal when the second identifier is determined as a target identifier, the first identifier is determined as the target identifier.

In one embodiment, a length of the first identifier is greater than a length of the second identifier.

In one embodiment, the first length is greater than the second length.

In one embodiment, an advantage of the above method includes a minimization of the number of padding bits in the first signal.

Embodiment 11

Figure 11:
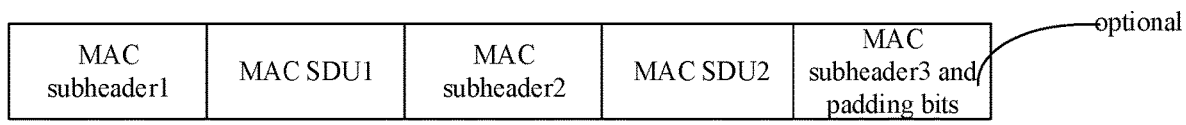
FIG. 11 illustrates a schematic diagram of a MAC PDU according to one embodiment of the present application.

Embodiment 11 illustrates a schematic diagram of a MAC PDU according to one embodiment of the present application; as shown in FIG. 11. The MAC PDU illustrated in FIG. 11 comprises multiple MAC SDUs and MAC subheaders respectively associated with these MAC SDUs; the number of bits comprised whether in a MAC SDU or a MAC subheader is a multiple of 8; although not shown herein, a MAC PDU can also comprise a MAC Control Element (CE); an end of a MAC PDU can comprise a padding bit and its MAC subheader; the introduction of padding enables a length of a MAC PDU to be equal to an allowable or designated TBS value, so that the padding and subheader in the MAC PDU is optional.

In one embodiment, a MAC subheader1 is a subheader of a MAC SDU1.

In one embodiment, a MAC subheader2 is a subheader of a MAC SDU2.

In one embodiment, a MAC subheader1 is a subheader associated with a MAC SDU1.

In one embodiment, a MAC subheader2 is a subheader associated with a MAC SDU2.

In one embodiment, the MAC PDU is used for uplink transmission.

In one embodiment, the MAC SDU1 carries the first data block.

In one embodiment, the MAC SDU2 carries the first data block.

In one embodiment, when the first signal carries the first message, the MAC SDU1 carries the first message.

In one embodiment, when the first signal carries the first message, the MAC SDU2 carries the first message.

In one embodiment, when the first signal carries the second message, the MAC SDU1 carries the second message.

In one embodiment, when the first signal carries the second message, the MAC SDU2 carries the second message.

In one embodiment, when the first signal carries the first message, the MAC SDU1 carries the first message, while the MAC SDU2 carries the first data block.

In one embodiment, when the first signal carries the second message, the MAC SDU1 carries the second message, while the MAC SDU2 carries the first data block.

In one embodiment, E2 given in Embodiment 9 is a size of the MAC PDU.

In one embodiment, E2 given in Embodiment 9 comprises a MAC subheader1, a MAC SDU1, a MAC subheader2 and a MAC SDU3, a MAC subheader3 and a number of padding bits.

In one embodiment, U2 given in Embodiment 9 comprises a number of bits comprised in a MAC subheader1.

In one embodiment, U2 given in Embodiment 9 comprises a number of bits comprised in a MAC subheader2.

In one embodiment, E2 given in Embodiment 9 comprises a number of bits comprised in a MAC SDU2 other than the target identifier, where the MAC SDU2 carries the target identifier.

In one embodiment, U2 given in Embodiment 9 comprises a MAC subheader3 and a number of padding bits associated with the MAC subheader3.

In one embodiment, the selection of the target identifier minimizes the number of the padding bits.

In one embodiment, when selection of the target identifier leads to a result of the number of padding bits being 0, there is no existence of a MAC subheader associated with the padding bit(s).

In one embodiment, when selection of the target identifier leads to a result of the number of padding bits being 0, the MAC PDU does not comprise a MAC subheader3 or padding bit(s).

In one embodiment, when selection of the target identifier leads to a result that the MAC PDU needs no padding bits, the MAC PDU does not comprise a MAC subheader3 or padding bit(s).

Embodiment 12

Figure 12:
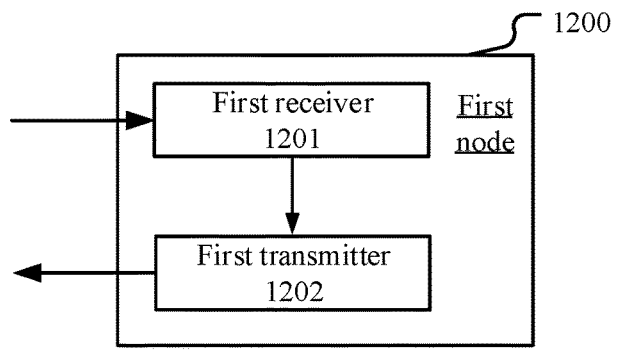
FIG. 12 illustrates a structure block diagram of a processing device in a first node according to one embodiment of the present application.

Embodiment 12 illustrates a structure block diagram of a processing device used in a first node according to one embodiment of the present application; as shown in FIG. 12. In FIG. 12, a processing device 1200 in the first node is comprised of a first receiver 1201 and a first transmitter 1202.

In Embodiment 12, the first receiver 1201, which receives a first signaling; and the first transmitter 1202, which transmits a first signal; herein, the first signaling is used to indicate a first identifier and a second identifier, the first identifier and the second identifier both being used to determine the first node 1200; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the first node 1200 is in a Radio Resource Control (RRC) Inactive state when transmitting the first signal.

In one embodiment, a first bit block is used for generating the first data block, and the first signal is a K-th retransmission for the first bit block, where K is a positive integer, a value of the K being used to determine the target identifier.

In one embodiment, a third logical channel is used for bearing the first data block, the third logical channel being a logical channel other than the first logical channel and the second logical channel.

In one embodiment, a length of the first identifier is a first length, while a length of the second identifier is a second length; the first length is unequal to the second length.

In one embodiment, the first receiver 1201 receives a second signaling, the second signaling being used to determine N reference value(s), where N is a positive integer, the N said reference value(s) being used to determine the size of the first signal.

In one embodiment, determination of the target identifier is used to minimize a number of padding bits carried by the first signal.

In one embodiment, determination of the target identifier is related to a type of a random access procedure associated with the first signal.

In one embodiment, the first node is a UE.

In one embodiment, the first node is a terminal supporting large time-delay difference.

In one embodiment, the first node is a terminal supporting NTN

In one embodiment, the first node is an aircraft.

In one embodiment, the first node is a vehicle-mounted terminal.

In one embodiment, the first node is a relay.

In one embodiment, the first node is a vessel.

In one embodiment, the first node is an IoT terminal.

In one embodiment, the first node is an IIoT terminal.

In one embodiment, the UE is a piece of equipment supporting transmissions with low delay and high reliability.

In one embodiment, the first receiver 1201 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460 or the data source 467 in Embodiment 4.

Embodiment 13

Figure 13:
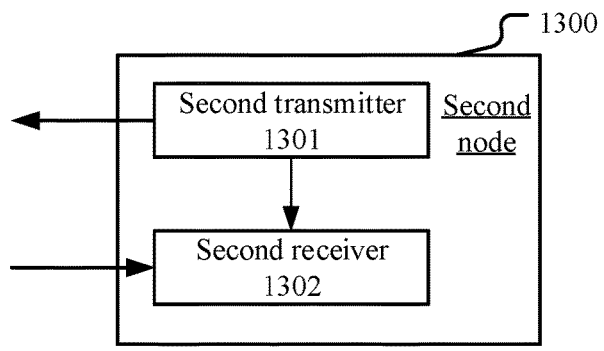
FIG. 13 illustrates a structure block diagram of a processing device in a second node according to one embodiment of the present application.

Embodiment 13 illustrates a structure block diagram of a processing device used in a second node according to one embodiment of the present application; as shown in FIG. 13. In FIG. 13, a processing device 1300 in the second node is comprised of a first transmitter 1301 and a first receiver 1302.

In Embodiment 13, the second transmitter 1301, which transmits a first signaling; and the second receiver 1302, which receives a first signal; herein, the first signaling is used to indicate a first identifier and a second identifier, the first identifier and the second identifier both being used to determine a transmitter for the first signal; the first signal carries a target identifier, the target identifier being either the first identifier or the second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; both a size of the first data block and a size of the first signal are used to determine the target identifier; the transmitter for the first signal is in a Radio Resource Control (RRC) Inactive state when transmitting the first signal.

In one embodiment, a first bit block is used for generating the first data block, and the first signal is a K-th retransmission for the first bit block, where K is a positive integer, a value of the K being used to determine the target identifier.

In one embodiment, a third logical channel is used for bearing the first data block, the third logical channel being a logical channel other than the first logical channel and the second logical channel.

In one embodiment, a length of the first identifier is a first length, while a length of the second identifier is a second length; the first length is unequal to the second length.

In one embodiment, the second transmitter 1301 transmits a second signaling, the second signaling being used to determine N reference value(s), where N is a positive integer, the N said reference value(s) being used to determine the size of the first signal.

In one embodiment, determination of the target identifier is used to minimize a number of padding bits carried by the first signal.

In one embodiment, determination of the target identifier is related to a type of a random access procedure associated with the first signal.

In one embodiment, the second node is a base station.

In one embodiment, the second node is satellite.

In one embodiment, the second node is a UE.

In one embodiment, the second node is a Gateway.

In one embodiment, the second node is a base station supporting large delay difference.

In one embodiment, the second transmitter 1301 comprises at least one of the antenna 420, the transmitter 418, the transmitting processor 416, the multi-antenna transmitting processor 471, the controller/processor 475 or the memory 476 in Embodiment 4.

In one embodiment, the second receiver 1302 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
a first transmitter, transmitting a first signal;
wherein the first signal carries a target identifier, the target identifier being either a first identifier or a second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; a size of the first signal is used to determine the target identifier; the first node is in a Radio Resource Control (RRC) Inactive state when transmitting the first signal; the first identifier includes a Medium Access Control (MAC) layer identifier; the second identifier includes a Medium Access Control (MAC) layer identifier; the first data block comprises a PDCP SDU.

2. The first node according to claim 1, wherein
the first identifier can be used to determine context of the first node.

3. The first node according to claim 1, wherein
the second identifier can be used to determine context of the first node.

4. The first node according to claim 1, comprising:
a first receiver, receiving a first signaling before the action of transmitting a first signal; the first signaling comprises a Radio Resource Control (RRC) message;
wherein the first node is in an RRC Connected state when receiving the first signaling; the first signaling indicates a first identifier set, with the first identifier being one in the first identifier set.

5. The first node according to claim 4, wherein
a transmitter for the first signaling is different from a receiver for the first signal.

6. The first node according to claim 1, wherein
a third logical channel is used for bearing the first data block, the third logical channel being a logical channel other than the first logical channel and the second logical channel.

7. The first node according to claim 1, wherein
the first signal belongs to the random access procedure.

8. The first node according to claim 7, wherein
determination of the target identifier is used to minimize a number of padding bits carried by the first signal.

9. The first node according to claim 8, wherein
determination of the target identifier is related to a type of a random access procedure associated with the first signal.

10. The first node according to claim 8, wherein
when the first signal carries the first message, the first data block and the first message are multiplexed onto a same MAC PDU; when the first signal carries the second message, the first data block and the second message are multiplexed onto a same MAC PDU.

11. The first node according to claim 8, wherein a header of a first signal is used to determine the first offset; the first offset comprises a number of remaining bits in the first message excluding the first identifier.

12. The first node according to claim 8, wherein when selection of the target identifier leads to a result of the number of padding bits being 0, there is no existence of a MAC subheader associated with the padding bit(s).

13. The first node according to claim 8, wherein the first receiver, receiving a second signaling, the second signaling being used to determine N reference value(s), where N is a positive integer, the N said reference value(s) being used to determine the size of the first signal.

14. The first node according to claim 4, wherein the first signal is transmitted on a Physical Uplink Shared Channel (PUSCH).

15. The first node according to claim 14, wherein the first signaling is transmitted in a Physical Downlink Shared Channel (PDSCH).

16. The first node according to claim 15, wherein the target identifier is a field in the first signal.

17. The first node according to claim 16, wherein a length of the first identifier is a first length, while a length of the second identifier is a second length; the first length is unequal to the second length.

18. The first node according to claim 16, wherein when a first quality is larger than a first quality threshold, determination of the target identifier is related to the size of the first data block and the size of the first signal.

19. A second node for wireless communications, comprising:
a second receiver, receiving a first signal;
wherein the first signal carries a target identifier, the target identifier being either a first identifier or a second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; a size of the first signal is used to determine the target identifier; a transmitter for the first signal is in a Radio Resource Control (RRC) Inactive state when transmitting the first signal; the first identifier includes a Medium Access Control (MAC) layer identifier; the second identifier includes a Medium Access Control (MAC) layer identifier; the first data block comprises a PDCP SDU.

20. A method in a first node for wireless communications, comprising:
transmitting a first signal;
wherein the first signal carries a target identifier, the target identifier being either a first identifier or a second identifier; when the target identifier is the first identifier, the first signal carries a first message; when the target identifier is the second identifier, the first signal carries a second message; a first logical channel is used for bearing the first message, while a second logical channel is used for bearing the second message, the first logical channel being different from the second logical channel, the first message and the second message coming from an Access Stratum; the first signal carries a first data block, the first data block being from a Non-Access Stratum; a size of the first signal is used to determine the target identifier; the first node is in a Radio Resource Control (RRC) Inactive state when transmitting the first signal; the first identifier includes a Medium Access Control (MAC) layer identifier; the second identifier includes a Medium Access Control (MAC) layer identifier; the first data block comprises a PDCP SDU.

* * * * *